United States Patent Office 2,757,540
Patented Aug. 7, 1956

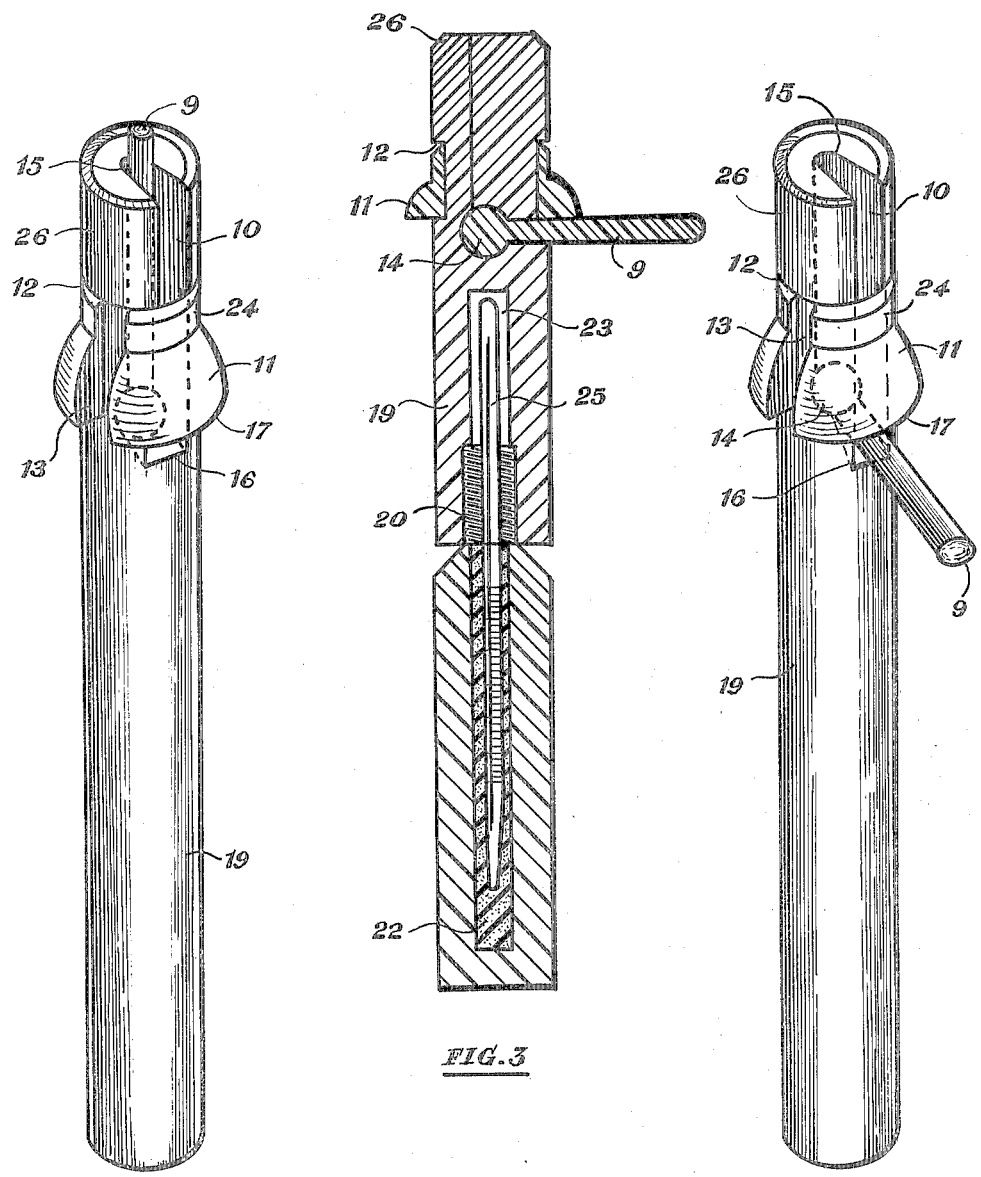

2,757,540

DEVICE FOR SHAKING DOWN A CLINICAL THERMOMETER

Harold Elcaness, Bronx, N. Y.

Application February 7, 1955, Serial No. 486,419

4 Claims. (Cl. 73—373)

The invention relates to an improved device for shaking down a clinical thermometer, said device comprising a recessed thermometer case having a bar or handle pivoted in the recess, and a slotted ring rotatable about the recess to permit pivoting the bar into or out of the recess, as well as permitting the bar or handle to be locked in recessed position or in extended position, as desired, depending on whether the slot in ring is or is not aligned with the recess. The undersurface of the ring projects over the bar in the extended position and when turned to the locked position, keeps the bar fixed so that revolution at a right angle of the case can be effected, and so that precession of the case is prevented. The case is revolved by holding the bar in the fingers of one hand while the case is tapped with the fingers of the other hand. A sponge rubber sheath placed in the bottom of the case buffers the thermometer against breakage and also serves as a reservoir for antiseptic. The ease of handling permits invalids to shake down a thermometer and avoids the accidental breakage when it slips from the fingers as it often does in the customary manner of shaking down a thermometer.

Figure 1 is a perspective view of the cap with the handle folded into the recess and the ring turned away from the recess. Figure 2 is a perspective view showing the handle in extension and the ring turned away from the recess. Figure 3 is a cross section of the entire device.

Thermometer casing cap 26 has a V-shaped recess 10, the walls 15 of which approach each other in such a manner that the handle 9 fits snugly into the recess 10 and is held thereby snug contact with the sides of the walls 15. The handle 9 can be extended away from the recess 10 and can be held in the extended position by means of a ring 11 which is slotted at 13 and which fits around a portion 12 of the cap where the shaft has been made somewhat smaller in diameter. The lower portion of the ring has a projecting ledge-like formation 17 which presses against the handle 9 when it is turned about the axis of the cap with its slot 13 turned away from the handle 9 so that the handle is held in extension away from the recess 10. When the slot 13 is brought in apposition with the recess 10, the handle 9 is in position to be replaced into the recess 10 and can be folded into the recess 10 by rotating on its ball shaped extremity 14 which fits into the socket 27 which surrounds the ball portion 14 of the handle 9. The ring 11, when turned so that its slot 13 is not coincident with the handle 9 serves to keep the handle 9 in the recess 10 of the cap in the folded or closed position. When the thermometer 25 is in the lower portion of the case and the case is capped, the mercury in the column of the thermometer 25 may be returned to the tip or well of the thermometer. By extending the handle away from the recess and turning the ring 11 so that the handle 9 is held in the extended position and the ledge of the ring 17 abuts against the shaft of the handle 9, the thermometer case now may be tapped with the finger of one hand while the handle 9 is held in the other hand. The revolution of the case containing the thermometer about the handle causes the mercury to return to the well by means of the centrifugal force generated by the revolution of the case.

I claim:

1. A device for shaking down a clinical thermometer comprising a casing formed to receive a thermometer to be shaken down, and also having a recess therein opening exteriorly of the casing, a handle extending from said casing and having a portion thereof in said recess, a pivotal connection between said portion and said casing, said connection permitting rotation of said casing on said handle on an axis transverse to the bore of a thermometer received in said casing, and said handle, connection and recess being arranged to permit the handle to be pivoted into said recess when not in use.

2. A device as claimed in claim 1 further comprising means to lock the handle alternately in deflected and recessed position.

3. A device as claimed in claim 1, wherein the connection is a ball and socket joint between handle portion and casing.

4. A device as claimed in claim 1 including a ring circumscribing the casing, and having a slot therein, said ring being rotatable around said casing so as to position the slot over the recess, or to position an unslotted portion over the recess, as desired, the arrangement being such that the handle can be pivoted into or out of the recess when the slot is in the recess, but not when the unslotted portion is over the recess.

References Cited in the file of this patent

UNITED STATES PATENTS 2,096,471    Sala ------------------ Oct. 19, 1937

FOREIGN PATENTS 23,500    Great Britain ------------------ 1905